United States Patent

Schunck et al.

[11] Patent Number: 6,158,825
[45] Date of Patent: Dec. 12, 2000

[54] PROCESS AND DEVICE FOR CONTROLLING A PUMP IN AN ELECTRO-HYDRAULIC BRAKE SYSTEM

[75] Inventors: Eberhardt Schunck, Landau; Jürgen Hachtel, Möckmühl, both of Germany

[73] Assignee: Robert Bosch GmbH, Stuttgart, Germany

[21] Appl. No.: 09/091,716

[22] PCT Filed: Jul. 25, 1996

[86] PCT No.: PCT/DE96/01373

§ 371 Date: Sep. 14, 1998

§ 102(e) Date: Sep. 14, 1998

[87] PCT Pub. No.: WO97/23373

PCT Pub. Date: Jul. 3, 1997

[30] Foreign Application Priority Data

Dec. 22, 1995 [DE] Germany .......................... 195 48 248

[51] Int. Cl.$^7$ .................................................. B60T 8/42
[52] U.S. Cl. .......................................... 303/115.4; 303/11
[58] Field of Search .............................. 303/10, 11, 115.4, 303/116.1

[56] References Cited

U.S. PATENT DOCUMENTS

| 4,824,184 | 4/1989 | Spadafora et al. ...................... 303/157 |
| 5,454,632 | 10/1995 | Burgdorf et al. ..................... 303/115.4 |
| 5,460,436 | 10/1995 | Volz et al. ............................ 303/116.1 |

FOREIGN PATENT DOCUMENTS

| 32 41 039 | 5/1984 | Germany . |
| 3241039 | 11/1984 | Germany . |
| 40 20 449 | 1/1992 | Germany . |
| 43 33 568 | 4/1995 | Germany . |
| 43 43 386 | 6/1995 | Germany . |
| WO 94/07717 | 4/1994 | WIPO . |
| WO 95/14595 | 6/1995 | WIPO . |

*Primary Examiner*—Michael Mar
*Assistant Examiner*—Robert A. Siconolfi
*Attorney, Agent, or Firm*—Kenyon & Kenyon

[57] ABSTRACT

A method and a device are described for controlling a pump of an electrohydraulic braking system. The hydraulic fluid is injected with control from a pressure accumulator via valves into the brake cylinders, the pressure accumulator being charged by a pump. The pump is driven with load regulation.

9 Claims, 4 Drawing Sheets

PROCESS AND DEVICE FOR CONTROLLING A PUMP IN AN ELECTRO-HYDRAULIC BRAKE SYSTEM

FIELD OF THE INVENTION

The present invention relates to a method and a device for controlling a pump of an electrohydraulic braking system.

BACKGROUND OF THE INVENTION

In a conventional electrohydraulic braking system, the brake fluid is injected from a pressure accumulator into the individual wheel cylinders via valves. This pressure accumulator is charged via a pump. If the pump operates continuously, it causes considerable noise emission and disturbs driving comfort. Furthermore, resonance effects can occur under certain operating conditions.

German Patent No. 32 41 039 describes a braking force regulation system that has an anti-lock control system and a power brake unit. In this context, German Patent 32 41 039 describes a method for controlling a pump of an electrohydraulic braking system whereby the hydraulic fluid is injected with control from a pressure accumulator via valve means into the wheel cylinders, the hydraulic fluid being supplied by the pump into the pressure accumulator, and the pump being driven with a mark-to-space ratio that is predefinable according to demand. German Patent No. 32 41 039 also discusses that an advantage of this braking force regulation system is that the noise level is considerably reduced only during operation of the power brake unit. However, the generation of noise is unchanged when the anti-lock control system is activated.

SUMMARY OF THE INVENTION

An object of the present invention is to provide for a method and a device which will enable the noise load to be reduced still further during operation of the electrohydraulic braking system.

DETAILED DESCRIPTION OF THE INVENTION

The object of the present invention is to provide a method and a device based thereon which will enable the noise load to be reduced still further during operation of the electrohydraulic braking system. This is accomplished by the features characterized in the independent claims.

Figure 1:
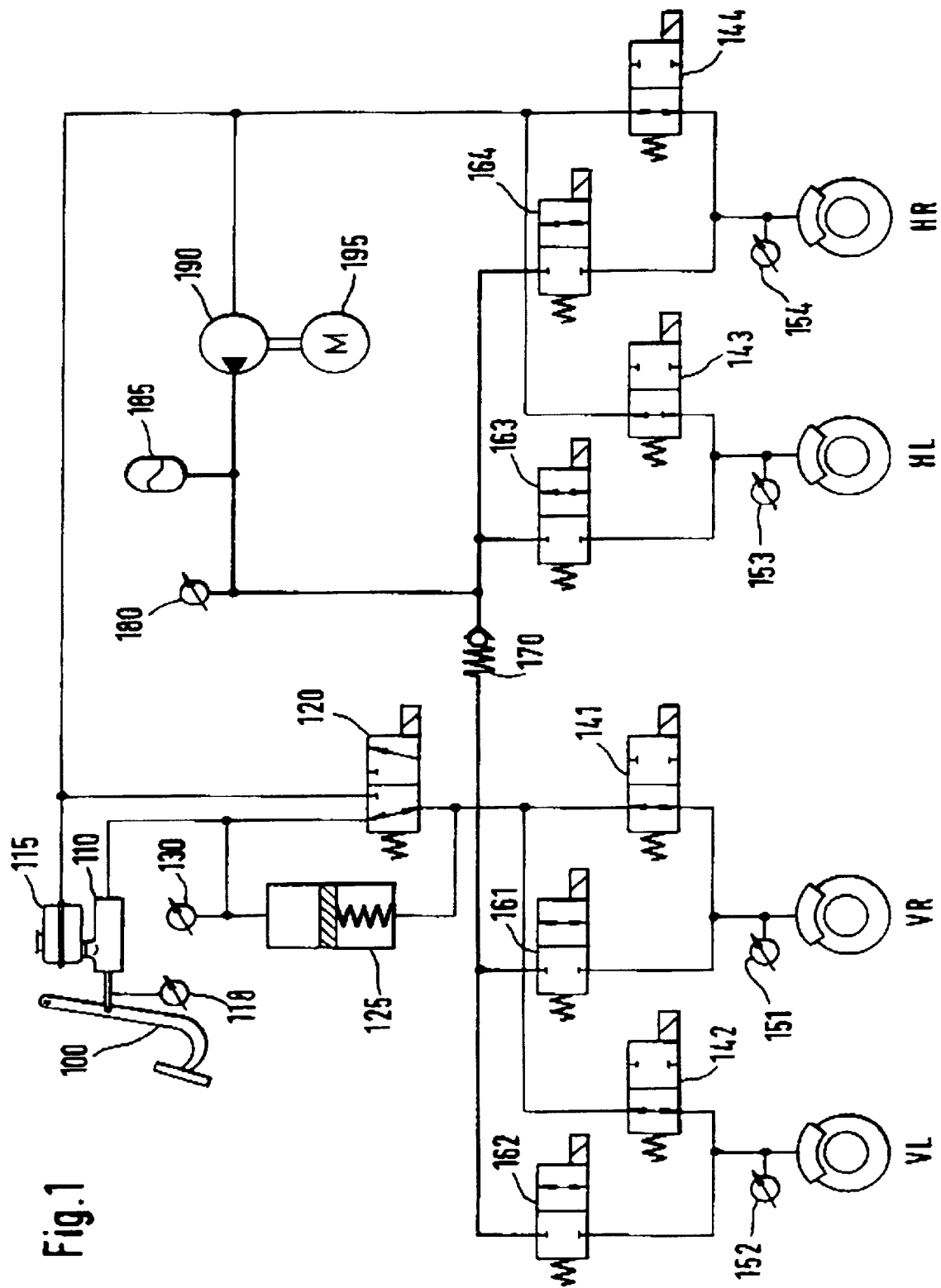
FIG. 1 shows a block diagram of an electrohydraulic braking system according to the present invention.

The essential elements of the electrohydraulic braking system are illustrated in FIG. 1. A brake pedal is indicated by 100. Via the brake pedal, pressure can be built up in a master brake cylinder 110. The movement of the brake pedal can be detected by a pedal travel sensor 118. The master brake cylinder is in contact with a reservoir 115. Master brake cylinder 110 is connected to a safety valve 120, which, when no flow is present, is in the position shown in FIG. 1. A pedal travel simulator 125 is switched parallel to the safety valve.

A pressure sensor 130 is disposed between master brake cylinder 110 and safety valve 120 and pedal travel simulator 125, respectively, in the connection line, supplying a signal that indicates the pressure PHZ in the master brake cylinder.

When no flow is present, safety valve 120 releases the connection between the master brake cylinder and the outlet valves 141 and 142. The outlet valves are also, in their condition when no flow is present, switched into admission position and release the connection to the brake cylinders.

Outlet valve 141 is allocated to brake cylinder VR of the right front wheel, and outlet valve 142 to brake cylinder VL of the left front wheel. The pressure in the brake cylinders can be detected by sensors 151 and 152.

Additionally, the brake cylinders are in contact with a pressure accumulator 185 via intake valves 161 and 162 and stop valve 170. The pressure prevailing in pressure accumulator 185 can be detected using pressure sensor 180. Intake valve 161 is assigned to the right front wheel, and intake valve 162 to the left front wheel.

Furthermore, pressure accumulator 185 is in contact with the brake cylinder HL of the left rear wheel and with the brake cylinder HR of the right rear wheel via intake valves 163 and 164. The brake cylinders of the left rear wheel and the right rear wheel are subsequently in contact with reservoir 115 via outlet valves 143 and outlet valves 144.

Outlets valves 141 and 142 can likewise be brought into contact with reservoir 115 via safety valve 120.

A pump 190, which is driven by a pump motor 195, supplies the hydraulic fluid from reservoir 115 into pressure accumulator 185.

This arrangement then works as follows. Safety valve 120 is traversed by flow during normal operation. Safety valve 120 releases the connection between reservoir 115 and the outlet valves and interrupts the connection between master brake cylinder 110 and the outlet valves. If the driver actuates brake pedal 100, sensor 118 transmits a signal that corresponds to the pedal travel of brake pedal 100, and/or sensor 130 delivers a pressure signal regarding the pressure in the master brake cylinder.

Based on at least one of these signals, which correspond to the driver's command input and possibly determines additional operating parameters, a control unit (not depicted) defines driving signals to be received by intake valves 161, 162, 163 and 164 and outlet valves 141, 142, 143 and 144.

Pump 190 is driven by pump motor 195 being traversed by flow and supplies hydraulic fluid from reservoir 115 into pressure accumulator 185. This results in an increase in the pressure in pressure accumulator 185, which is measured by pressure sensor 180. By opening intake valves 161 through 164 and closing outlet valves 141 through 144, the pressure in the brake cylinders is increased independently of the driver's command. By opening the outlet valves and closing the intake valves, the pressure in the brake cylinders can be reduced in accordance with the pedal actuation.

It is particularly advantageous for the pressure prevailing in the brake cylinders to be measured by pressure sensors 151 through 154. This allows for regulation of pressure and/or monitoring of errors.

Pedal travel simulator 125 causes the driver to sense a force on the brake pedal corresponding to an equivalent actuation of the brake pedal as would occur in a customary braking system.

If the arrangement fails, safety valve 120 is without current and releases the connection between master brake cylinder 110 and the brake cylinders for the front wheels VL and VR. The driver thereby has access to the brake cylinders of the front wheels via the brake pedal.

Pump 190 must supply sufficient hydraulic fluid into pressure accumulator 185 so that sufficient brake pressure is available. In accordance with the present invention, pump motor 195, via which the pump is driven, is driven with load regulation. To ensure that the accumulator is not emptied by multiple actuations of the brake, this load regulation is set as a function of the volume consumption from braking.

Figure 2:
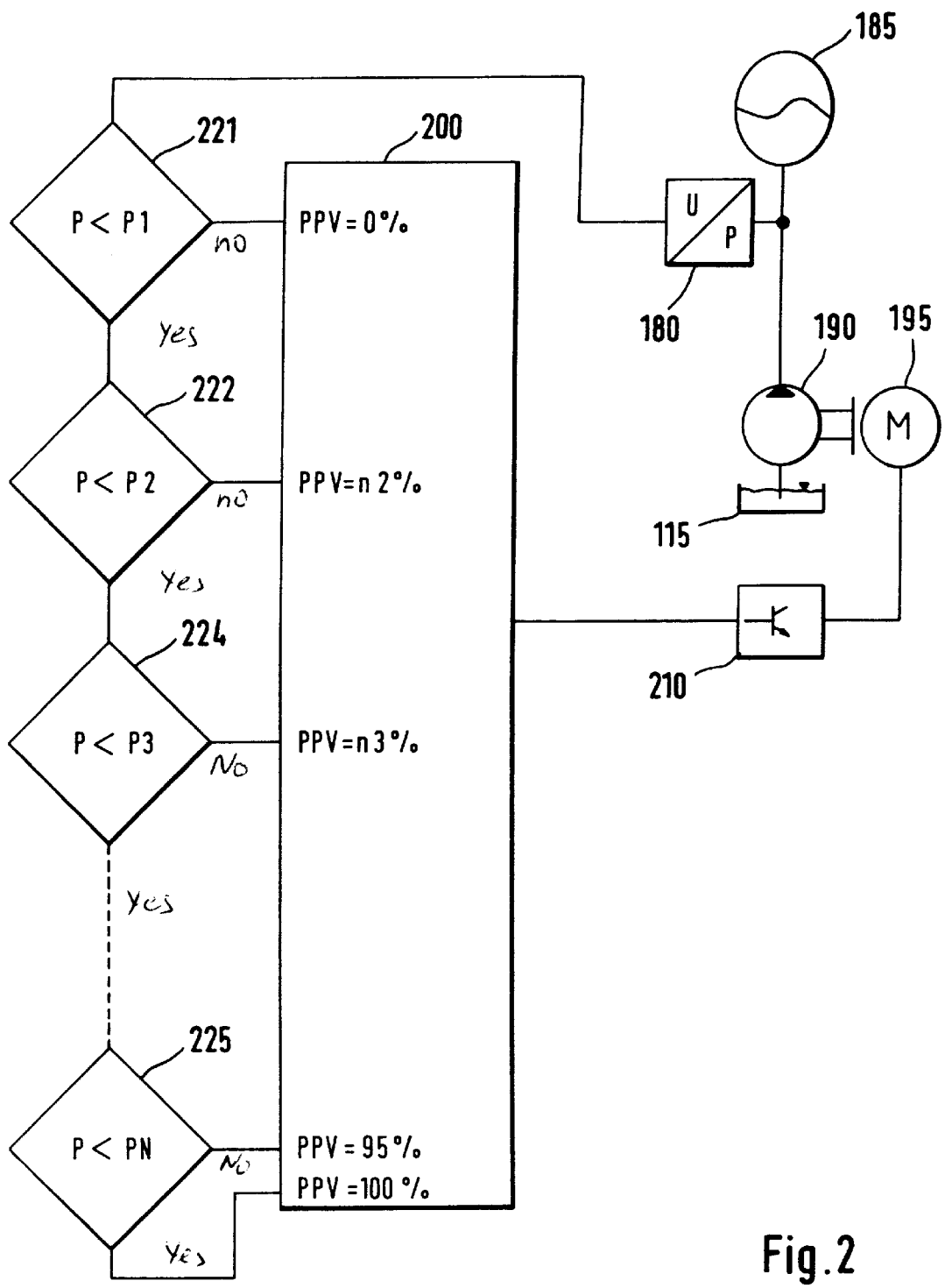
FIG. 2 shows a first exemplary embodiment of the pump control of the electrohydraulic braking system according to the present invention.

An exemplary embodiment of control in accordance with the present invention is represented in FIG. 2. Elements that were already described in FIG. 1 are designated by corresponding reference numbers. Voltage is applied via an output stage 210 to pump motor 195. For this, output stage 210 receives a signal having a predefinable mark-to-space ratio PPV from a control unit 200. Control unit 200 selects the mark-to-space ratio as a function of pressure P, which is detected by sensor 180.

If a first query 221 recognizes that pressure P is less than a first threshold value P1, then an additional query 222 results. If this is not the case, a first mark-to-space ratio of 0% is selected. This means the pump motor is not traversed by flow. Query 222 checks whether pressure P is less than a second threshold value P2. If this is not the case, a mark-to-space ratio of N2% is selected. If the pressure is less than P2, an additional query 223 checks whether pressure P is less than a threshold value P3. If this is not the case, mark-to-space ratio PPV of N3% is selected. If this is the case, additional queries follow. A final query 225 checks whether pressure P is less than an additional threshold value PN. If this is not the case, the mark-to-space ratio of 95%, for example, is selected. If this is the case, a mark-to-space ratio of 100% is selected. Thus, the pump motor is being fully traversed by flow. For pressure values P1, P2 through PN, P1 is the largest pressure value, and PN the smallest pressure value.

The power control of the pump motor is realized via the mark-to-space ratio of the control current in this exemplary embodiment. In this context, the mark-to-space ratio is set as a function of the deviation in the accumulator pressure from a setpoint value P1. The greater the deviation of the setpoint pressure from the actual pressure, or the lower the pressure value, the greater is the mark-to-space ratio of the pump control.

Provision can also be made according to the present invention for the mark-to-space ratio to be predefinable in proportion to the deviation in pressure P from setpoint value P1.

Figure 3A:
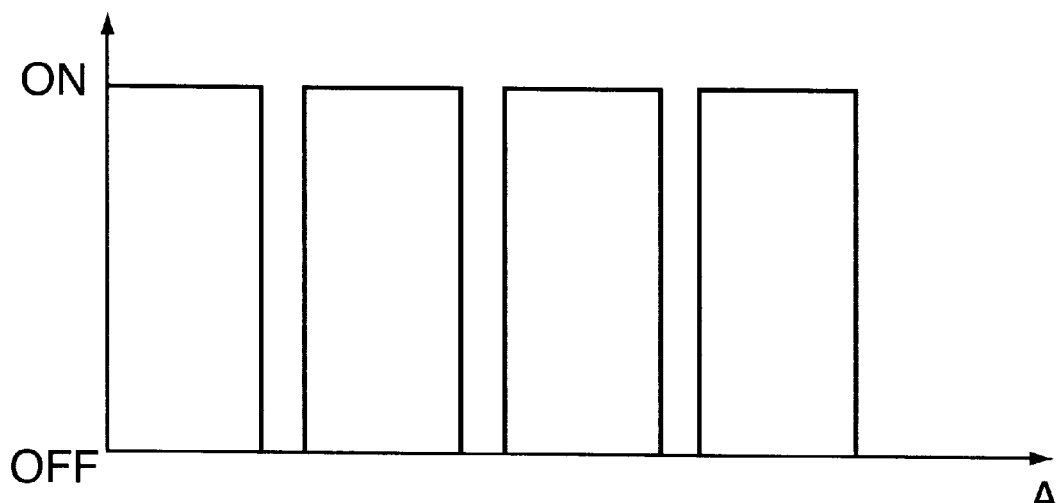
FIG. 3a shows a driving signal for acting upon the output stage of the pump motor.
Figure 3B:
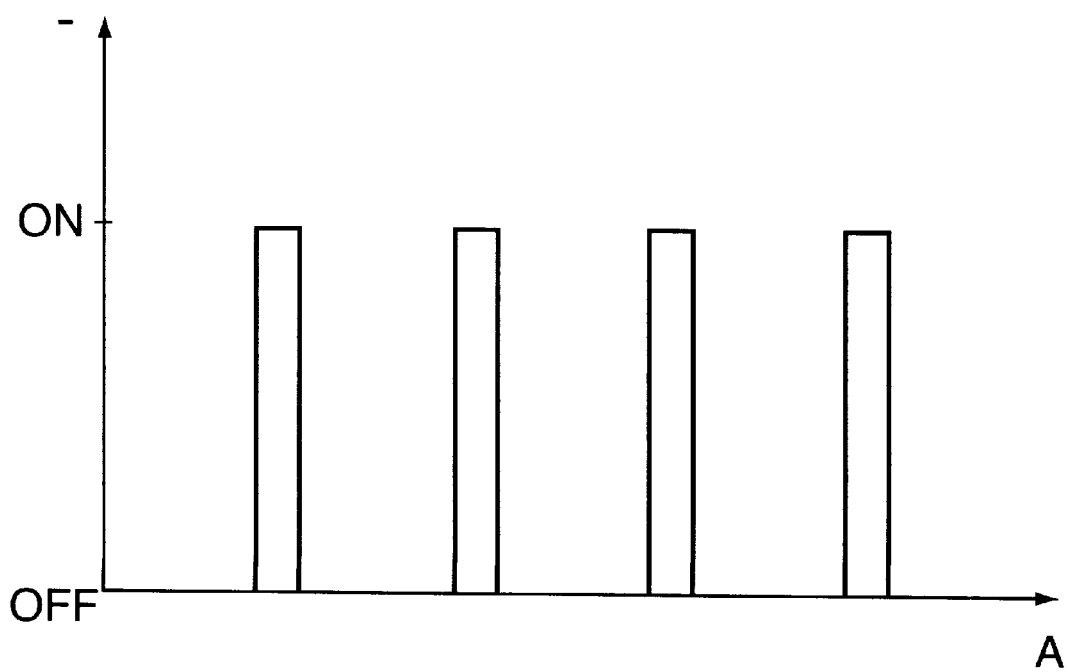
FIG. 3b shows another driving signal for acting upon the output stage of the pump motor.

Various control signals for different mark-to-space ratios PPV are plotted in FIGS. 3a and 3b. FIG. 3a illustrates a signal having a high mark-to-space ratio, which is used when the pressure has fallen off considerably. FIG. 3b illustrates a signal having a low mark-to-space ratio, which is selected when there is only a slight demand for hydraulic fluid.

Figure 4:
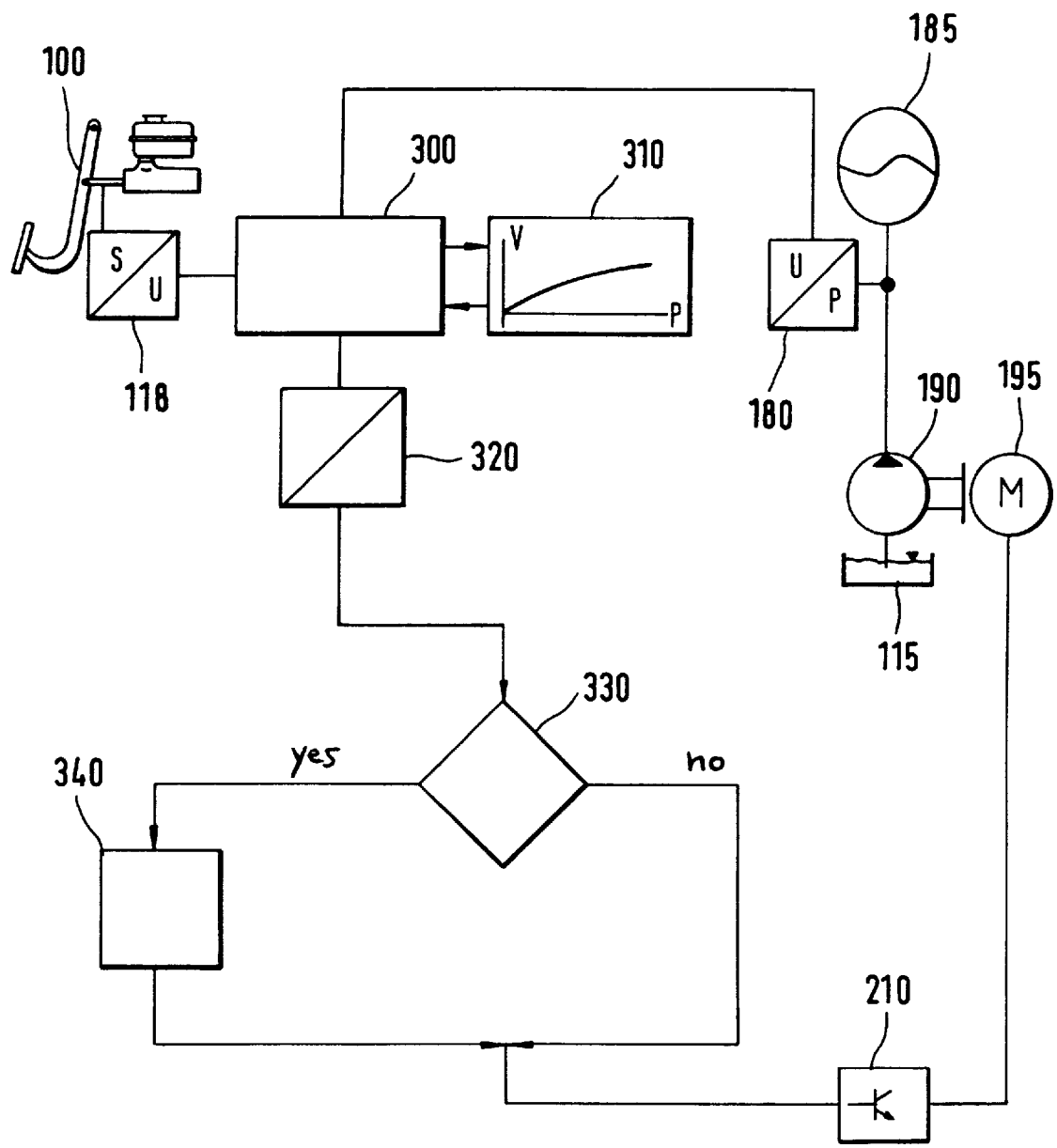
FIG. 4 shows a further exemplary embodiment of the control according to the present invention.

FIG. 4 illustrates a further exemplary embodiment of the procedure according to the present invention. Elements already described are designated by corresponding reference numbers. A consumption detector 300 receives the signals from sensor 118, sensor 180 and a braking model 310. Consumption detector 300 transmits signals, on the one hand, to braking model 310 and, on the other hand, to power setpoint input 320.

In a particularly advantageous exemplary, provision is made for a query 330 which checks whether resonance can occur. If this is the case, the frequency of the control signal is changed in step 340. If this is not the case, then output stage 210 is controlled directly.

This device then functions as follows. Based on the pressure in the pressure accumulator and the actuation of the brake pedal that is detected by sensor 118, consumption detector 300 determines volume output PV, which must be supplied by pump 190. Volume output PV corresponds to the volume V of brake fluid to be supplied by the pump within a specified period of time.

This occurs by using braking model 310. The braking model is configured as performance data (i.e. a characteristics map), for example, in which volume V of hydraulic fluid to be supplied is stored as a function of pressure P. There is a practically linear relationship between volume V and pressure P. This can be roughly expressed by the following formula:

$$V = A + B*P$$

where A and B are constants that are known or that can be measured.

Volume demand V is almost the same for each braking. Volume output PV results from the number of braking operations within a specified period of time. The number of braking operations is determined on the basis of the brake signal actuation.

Based on the specified volume output, power setpoint input 320 determines the necessary output and mark-to-space ratio PPV with which pump motor 195 must be triggered. The relation between mark-to-space ratio PPV and volume output PV is:

$$PVmax*PPV = PV$$

where PVmax is the maximum possible volume output of the pump for full flow-through, that is with a PPV of 100%.

Query 330 checks whether resonance effects can occur. The operating conditions under which resonance effects can occur are determined empirically. The presence of these operating conditions is checked in query 330. Resonance frequencies are also calculated. Resonance occurs particularly when there is a linear relationship between the pump speed and mark-to-space ratio PPV. If query 330 detects such a frequency, then resonance is recognized. If this is the case, the frequency of the driving signal is changed in step 340. Output stage 210 is then triggered by the driving signal acquired in this manner.

In this exemplary embodiment, the output control is realized via a mark-to-space ratio of the driving current. In this context, the mark-to-space ratio is set as a function of a model to determine the volume consumption value of the braking when using a braking model. The braking model takes into account that an elevated volume consumption is the result of multiple braking operations at a higher pressure within a short period of time. To compensate for this, greater pump output, that is a higher mark-to-space ratio, is necessary. The volume consumption for stationary braking at a lower pressure is less. In this case, the recharging of the accumulator can be achieved with less output, that is with a lower mark-to-space ratio.

Provision can be made in both exemplary embodiments according to FIGS. 2 and 4 to avoid excitations in a well-directed manner. For this, the excitation frequencies that lead to increased noise emission are determined, and the output control, in particular the frequency of the mark-tospace ratio, is set so as to ensure that these resonances do not occur. For information on the pump excitation frequency, a high-frequency component of the accumulator pressure signal can be evaluated.

The mark-to-space ratio is selected so as to achieve minimal noise and, at the same time, a relatively rapid recharging of the accumulator. The period duration of the cycle therefore becomes shorter than the overtravel time constant of the motor pump system.

What is claimed is:

1. A method for controlling a pump of an electrohydraulic braking system, with a predetermined resonance characteristic in relation to the electrohydraulic braking system, the method comprising the steps of:

controllably injecting a hydraulic fluid from a pressure accumulator into wheel cylinders via a valve arrangement;

providing the hydraulic fluid into the pressure accumulator using the pump;

driving the pump at a pump driving frequency in accordance with a frequency of a control signal using a mark-to-space ratio determined as a function of a demand for the hydraulic fluid; and defining the frequency of the control signal on the basis of the predetermined resonance characteristic.

2. The method according to claim 1, further comprising the steps of:

determining whether the pump driving frequency causes resonance effects on the basis of the predetermined resonance characteristic; and changing the pump driving frequency when the pump driving frequency causes the resonance effects as determined by the determining step.

3. The method according to claim 1, wherein the predetermined resonance characteristic is determined empirically.

4. The method according to claim 2, wherein the predetermined resonance characteristic includes at least one excitation frequency; and setting the pump driving frequency so as to avoid the at least one excitation frequency.

5. The method according to claim 1, further comprising the step of:

defining the mark-to-space ratio as a function of a volume of the hydraulic fluid.

6. The method according to claim 1, further comprising the step of:

defining the mark-to-space ratio as a function of an accumulator pressure signal of the pressure accumulator.

7. A method for controlling a pump of an electrohydraulic braking system, comprising the steps of:

controllably injecting a hydraulic fluid from a pressure accumulator into wheel cylinders via a valve arrangement;

providing the hydraulic fluid into the pressure accumulator using the pump;

driving the pump using a mark-to-space ratio determined as a function of a demand for the hydraulic fluid;

defining a frequency of a control signal of the pump as a function of resonance effects; and analyzing a high-frequency component from an accumulator presure signal to determine information regarding excitation frequencies of the pump.

8. A method for controlling a pump of an electrohydraulic braking system, comprising the steps of:

controllably injecting a hydraulic fluid from a presure accumulator into wheel cylinders via a valve arrangement;

providing the hydraulic fluid into the pressure accumulator using the pump;

driving the pump using a mark-to-space ratio determined as a function of a demand for the hydraulic fluid; and defining a frequency of a control signal of the pump as a function of resonance effects, wherein a period duration of the control signal is less than an overtravel time constant of a motor pump system.

9. A device for controlling a pump of an electrohydraulic braking system, with a predetermined resonance characteristic in relation to the electrohydraulic braking system, the electrohydraulic braking system including a pressure accumulator, a valve arrangement and the pump, the pressure accumulator controllably injecting a hydraulic fluid into wheel cylinders via the valve arrangement, the pump providing the hydraulic fluid into the pressure accumulator, the device comprising:

a control system determining a mark-to-space ratio as a function of a demand for the hydraulic fluid, wherein the control system defines a frequency of a control signal for driving the pump at a pump driving frequency on the basis of the predetermined resonance characteristic and drives the pump using the mark-to-space ratio.

* * * * *

UNITED STATES PATENT AND TRADEMARK OFFICE
CERTIFICATE OF CORRECTION

PATENT NO. : 6,158,825
DATED : December 12, 2000
INVENTOR(S) : Schunck et al.

It is certified that error appears in the above-identified patent and that said Letters Patent is hereby corrected as shown below:

Column 1,
Line 9, change "BACKGROUND OF THE INVENTION" to -- BACKGROUND INFORMATION --.
Line 39, insert -- The procedure according to the present invention facilitates low noise emission from the pump and the braking system. Therefore, it is possible to use less costly and more economical pumps, such as a piston pump. Furthermore, electrical system current fluctuations and hence electromagnetic disturbances can be reduced. An additional advantages results in that the occurrence of resonance can be avoided --.

Signed and Sealed this

Twenty-fifth Day of December, 2001

Attest:

Attesting Officer

JAMES E. ROGAN
Director of the United States Patent and Trademark Office